(12) United States Patent
Scott

(10) Patent No.: US 8,696,790 B2
(45) Date of Patent: Apr. 15, 2014

(54) CONVERSION OF ORGANIC WASTES INTO A REDUCING AGENT—COKE SUBSTITUTE

(75) Inventor: Jack Alan Scott, Rockwall, TX (US)

(73) Assignee: CONECSUS LLC, Santa Clara, CA (US)

( * ) Notice: Subject to any disclaimer, the term of this patent is extended or adjusted under 35 U.S.C. 154(b) by 169 days.

(21) Appl. No.: 13/192,246

(22) Filed: Jul. 27, 2011

(65) Prior Publication Data

US 2013/0025411 A1 Jan. 31, 2013

(51) Int. Cl.
*C22B 1/00* (2006.01)

(52) U.S. Cl.
USPC .................... 75/751; 75/303; 75/772; 75/961

(58) Field of Classification Search
USPC .................................. 75/303, 751, 961, 772
See application file for complete search history.

(56) References Cited

U.S. PATENT DOCUMENTS

| | | | |
|---|---|---|---|
| 3,901,487 A * | 8/1975 | Keser ............................ | 366/76.6 |
| 3,941,359 A * | 3/1976 | Shinville et al. .............. | 266/177 |
| 4,077,847 A | 3/1978 | Choi et al. | |
| 4,118,281 A | 10/1978 | Yan | |
| 4,268,275 A | 5/1981 | Chittick | |
| 4,415,360 A | 11/1983 | Leirnes et al. | |
| 4,705,562 A | 11/1987 | Hedlund | |
| 5,017,269 A | 5/1991 | Loomans et al. | |
| 5,170,725 A | 12/1992 | Sass et al. | |
| 5,411,714 A | 5/1995 | Wu et al. | |
| 5,496,392 A | 3/1996 | Sims et al. | |
| 5,885,328 A * | 3/1999 | Markarian et al. ............. | 75/770 |
| 5,922,261 A * | 7/1999 | Ford, Jr. ........................ | 264/122 |
| 6,709,510 B1 * | 3/2004 | Young et al. .................. | 106/745 |
| 7,175,691 B2 * | 2/2007 | Sugitatsu et al. .............. | 75/560 |
| 7,198,658 B2 * | 4/2007 | Sugitatsu et al. .............. | 75/503 |
| 7,621,225 B2 | 11/2009 | Walker | |
| 7,632,330 B2 * | 12/2009 | Eisele et al. ................. | 75/10.46 |
| 7,893,307 B2 | 2/2011 | Smith | |
| 8,444,746 B2 * | 5/2013 | Meynerts et al. ............... | 75/772 |
| 2006/0280669 A1 | 12/2006 | Jones | |
| 2010/0175510 A1 * | 7/2010 | Harada et al. ................... | 75/750 |
| 2010/0205860 A1 * | 8/2010 | Kawami et al. ................. | 44/597 |
| 2012/0192678 A1 * | 8/2012 | Stebbing ..................... | 75/10.62 |

FOREIGN PATENT DOCUMENTS

| EP | 0293234 | | 11/1988 | |
|---|---|---|---|---|
| JP | 01-004225 A | * | 1/1989 | |
| JP | 2005105303 A | * | 4/2005 | ............... C12C 1/02 |

OTHER PUBLICATIONS

Derwent Acc No. 2005-369992 for the patent family including KR 2004001132 A by Choo et al published Jan. 6, 2005.*
Machine translatino of JP 2005-105303 A published Apr. 2005.*
Brochure entitled "Thermoplastic and Holt Melt Compounding Systems," by B.P. Process Equipment, http://www.bpprocess.com/images/brochures/B&P%20Twin%20Screw%20Brochure.pdf (retrieved from the internet on Sep. 30, 2013).

* cited by examiner

*Primary Examiner* — George Wyszomierski
*Assistant Examiner* — Tima M McGuthry Banks
(74) *Attorney, Agent, or Firm* — Thompson Hine L.L.P.

(57) ABSTRACT

A process for converting organic wastes into a reducing agent-coke substitute ("RACS"). More specifically, a process for producing a reducing agent-coke substitute from a mixed waste material containing economically recoverable metals and organic based materials is described. In accordance with one aspect, the process comprises blending mixed waste material with a metal-containing smelter by-product, processing the blend of mixed waste material and smelter by-product through a heated mixing device to convert the blend into reducing agent-coke substitute.

24 Claims, 2 Drawing Sheets

CONVERSION OF ORGANIC WASTES INTO A REDUCING AGENT—COKE SUBSTITUTE

BACKGROUND

The present application relates to a process for converting organic wastes into a reducing agent-coke substitute (RACS). More specifically, the present application describes a process for producing a reducing agent-coke substitute from a mixed waste material containing organic based materials and economically recoverable metals.

Mixed waste materials contain various concentrations of economically recoverable metals, such as tin, lead, antimony, silver and gold that are comingled with, or an integral part of, organic-based materials, such as paper, latex, wood, plastic, fiber, vinyl scrap and cloth. It can be difficult to recover the desired metals from these mixed waste materials because of the presence of the organic-based materials which can interfere with the recovery of metals under normal processing operations.

Traditionally, mixed waste materials containing organic materials and recoverable metals are processed by destroying the organic materials via combustion in a furnace at temperatures from about 800-1200° F. and then recovering the remaining metals by smelting and refining. In order to process the organic materials without having the materials combust explosively, the furnace temperature must be lowered from the normal operating temperatures of 1800° F. or higher to room temperature. The organic-containing materials are slowly heated to remove the organic matter in the composition and then the temperature is raised to the normal operating temperature. Lowering the furnace temperature to process organic materials results in slower and inefficient processing. Furthermore, in some cases burning embers may be entrained in the off-gas and cause the bags in the baghouse to catch fire, thereby causing production stoppages, expensive repairs, and inadvertent releases of heavy metals to the environment.

Metals can be recovered from metal oxides using coke as a reducing agent. The present application is directed to a process for handling mixed waste materials in an efficient manner to produce a reducing agent-coke substitute that can be utilized in place of coke during the recovery of metals from metal oxides. In accordance with certain aspects, the resulting reducing agent may be at least 50% as effective and, in some cases, even more effective than coke.

SUMMARY

The present application describes a process for converting organic wastes into a reducing agent-coke substitute. More specifically, a process for producing a reducing agent-coke substitute from a mixed waste material containing organic based materials and economically recoverable metals is described. In accordance with one aspect, the present invention provides a process for converting a product designated as hazardous waste into a non-hazardous one.

In accordance with one aspect, the process comprises blending mixed waste material with a metal-containing smelter by-product, processing the blend of mixed waste material and smelter by-product to convert the blend into reducing agent-coke substitute. In accordance with particular aspects, the blend is processed through a heated mixing device such as a twin screw mixer. Typically, the mixed waste material will be ground to an appropriate size to facilitate processing through the mixer.

Another aspect of the present invention relates to the reducing agent-coke substitute produced by the process described herein. The reducing agent-coke substitute may be used as a reducing agent to convert metal oxides to metals. The reducing agent-coke substitute may be at least 50% as effective as coke or even more effective than coke.

DETAILED DESCRIPTION

The present application describes a process for converting organic wastes into a material suitable to be used as a reducing agent. More specifically, the present application is directed to a process for producing a carbon-based reducing agent from a mixed waste material wherein the mixed waste material contains economically recoverable metals, such as tin, lead, antimony, silver and gold. The metals in the mixed waste material may be comingled with, or an integral part of, organic based materials, such as paper, plastic, latex, wood, fiber, vinyl scrap and cloth.

Figure 1:
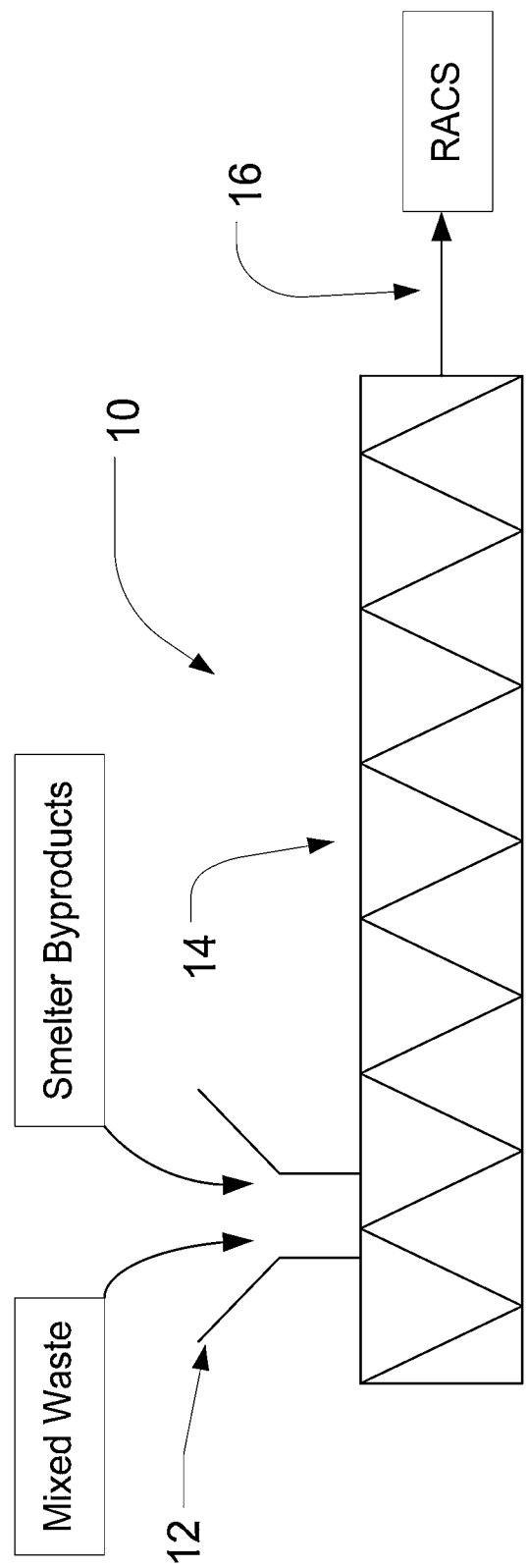
FIG. 1 is a diagrammatical view illustrating a particular embodiment of the process described herein.

As illustrated in FIG. 1, a processing system 10 useful for practicing certain aspects of the present invention includes a feed hopper 12 attached to a mixer 14. Mixed waste and smelter byproducts are introduced into the feed hopper 12 and fed through the mixer 14. The mixed waste and smelter byproducts may be introduced through the same hopper, as shown in FIG. 1, or through separate hoppers (not shown). Furthermore, the hoppers may be relatively close to one another or spaced apart. By spacing the hoppers apart by some distance, it is possible to subject one or both of the feeds to heat and/or shear for an extended period of time to provide a more uniform starting material. The mixer 14 may be a heated continuous mixer such as a twin screw continuous mixer. Examples of suitable mixers are commercially available, such as the BP-Series Twin Screw mixers from B & P Process Equipment. These mixers are co-rotating and intermeshing twin screw mixers capable of heating and mixing the materials to be processed to produce an extrudate or discharge 16 in the form of a compressed material or reducing agent-coke substitute intimately mixed with smelter byproducts to be reduced.

As used herein, the term "mixed waste" refers to materials, typically discarded or waste materials, that contain economically recoverable metals in combination with organic based materials. Examples of recoverable metals include, but are not limited to, tin, lead, antimony, silver and gold. Examples of organic based materials that may be present with the metals include, but are not limited to, paper, plastic, latex, wood, fiber, vinyl scrap and cloth. Specific examples of mixed waste materials include, but are not limited to, protective x-ray aprons and waste materials generated in the course of manufacturing electronics. The described process is particularly well suited for use with materials commonly referred to as "paste and wipes," which are a complex mixture of recoverable metals and organic based materials derived from the electronics manufacturing industry. Specific examples of paste and wipes include solder paste tubes, solder paste jars, wipes, latex gloves, wooden or paper cotton swabs, and cardboard. Likewise, the process can be used to process vinyl protective x-ray aprons that contain powdered tin, lead, antimony metal, or combinations thereof.

The term "smelter byproducts" refers to metal-containing byproducts formed during smelting operations. Examples of smelter byproducts include, but are not limited to, oxides, dross, baghouse fume, filter cake, residues and other metal-containing compositions to be recycled. In accordance with certain embodiments, the smelter byproducts comprise from about 5 to 60%, more particularly from about 20 to 40% by weight of the final reductant.

Figure 2:
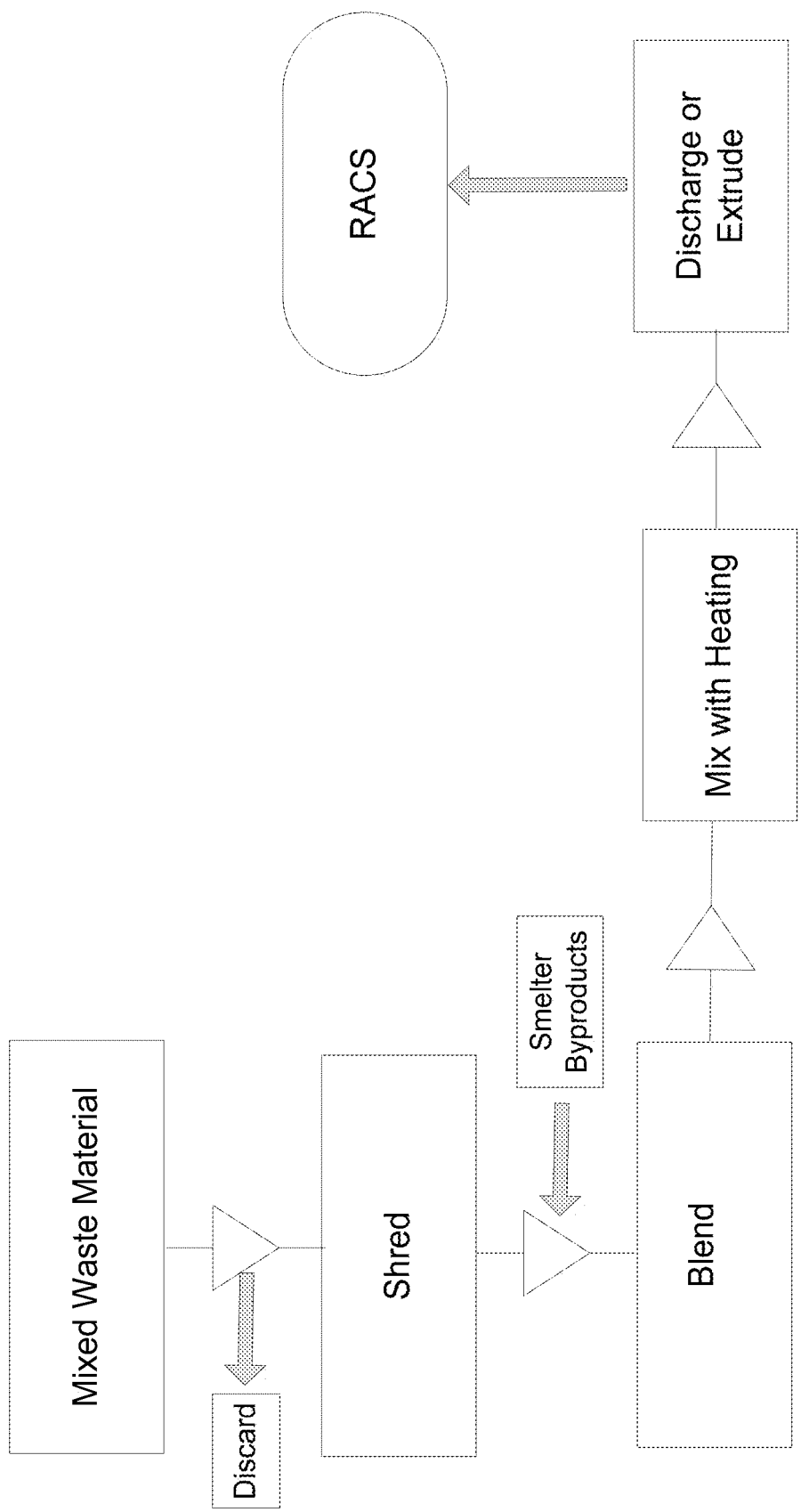
FIG. 2 is a flow chart illustrating one aspect of the process described herein.

FIG. 2 illustrates a flow chart for a more specific embodiment for converting organic waste to a RACS. As shown in FIG. 2, mixed waste material may be dried if the moisture content is greater than about 10%. Moisture content typically should be less than 7%, more particularly less than 5% for the material to be processed. The mixed waste material may be sorted to remove any undesirable components of the material that may interfere with processing through the mixer. Iron, steel and other magnetic components of the material may be removed by using a magnet.

The mixed waste material typically will be mixed and ground or shredded to reduce the particle size of the material and produce a more uniform feed. In accordance with some aspects, material typically is reduced in size to less than 1 inch, more particularly less than ½ inch or even less than ¼ inch in diameter. Suitably, the particles are small enough to provide good mixing.

In accordance with the embodiment shown in FIG. 2, the mixed waste material of reduced particle size is blended with one or more smelter byproducts. The smelter byproducts can be used to modify the properties, such as the density, of the final reductant and provide a product in a form that is suitable to mix with the metal and slag in the smelting furnace as part of the metal recovery process. The ratio of the amount of waste material to smelter byproduct is dependent upon the particular composition of each component and may vary significantly.

The blend of mixed waste material and smelter byproducts is transported through the heated mixing device, such as a twin screw mixer, at a temperature and for a sufficient amount of time to convert the blend into a suitable RACS product. Operating parameters for the mixer such as temperature, dwell time, screw dimensions, transport speed, etc. will depend on the particular device and the composition of the waste material and smelter byproducts. In accordance with certain embodiments, the blend is processed at temperatures between about 200° and 750° F., more particularly between about 400° and 585° F. Typically, the temperature and other conditions of the mixer should provide an environment capable of melting the plastic materials in the waste and volatilizing low boiling point organic substances. In accordance with certain aspects, the conditions may be suitable for inducing at least some pyrolysis of the organic matter. However, complete pyrolysis of the organic matter is not required. The treatment of the organic material should be sufficient to reduce the volatile content of the material to a point where the risk of an explosion in the smelting furnace is minimized.

The resulting densified reductant material may be discharged directly from the mixer or extruded through a die. In accordance with certain embodiments, the mixing process blends the mixed waste and smelter byproducts into a relatively uniform product containing an acceptably low concentration (less than 60%) of organic materials that are volatile at the temperature of the smelting furnace (typically around 1500-2500° F.). The resulting product may contain some residual hydrocarbons.

In accordance with certain aspects of the present invention, the resulting RACS product may be in the form of clumps, strands or pellets. The reductant product should be dense enough to minimize the risk of fly away in the furnace. Typically, the RACS particles will have a particle size of about ⅛ inch or more, more particularly about ¼ inch or more. In accordance with certain embodiments, the particles may have a particle size of about 1 inch in diameter or less. In accordance with certain aspects, the density of the particles is approximately the same as the density of the metal and metal oxides to facilitate mixing and formation of a relatively homogeneous composition. The RACS product may be non-friable. The term "non-friable" indicates that the components of the product are sufficiently bound in the product matrix such that the product is not prone to flaking, separation or powdering.

In accordance with certain aspects, the RACS product may have the following typical properties:

TABLE 1

| Property | Narrow Range | Broad Range |
|---|---|---|
| Specific Gravity | 1.4-1.9 | 1.0-2.0 |
| Volatile Matter | 30%-60% | 5%-70% |
| Fixed Carbon | 2%-5% | 0%-75% |
| Hydrogen | 2%-6% | 1%-10% |

RACS samples were prepared in accordance with one aspect of the present invention and compared to coke with respect to various parameters as indicated in Tables 2 and 3 below:

TABLE 2

| | D5142 Proximate by Automated TGA System | | | | | | |
|---|---|---|---|---|---|---|---|
| | | Volatile Matter | | Fixed Carbon | | Ash | |
| Sample ID: | Moisture, Total wt % | As received wt % | Moist. Free wt % | As Received wt % | Moist. Free wt % | As Received wt % | Moist. Free wt % |
| RACS | 1.20 | 50.04 | 50.65 | 3.21 | 3.25 | 45.55 | 46.10 |
| Coke | 0.36 | 2.63 | 2.64 | 96.11 | 96.46 | 0.89 | 0.89 |

TABLE 3

| Sample ID: | Carbon Moist. Free wt % | Hydrogen D5373 Moist. Free wt % | Nitrogen Moist. Free wt % | Oxygen D5373 Moist. Free wt % | Sulfur D4239 Moist. Free wt % |
|---|---|---|---|---|---|
| RACS | 40.34 | 4.26 | 0.22 | 11.87 | 0.573 |
| Coke | 75.76 | 0.53 | 0.79 | <0.05 | 2.599 |

The reductant produced in accordance with the process described herein is useful as a reducing agent-coke substitute. It can be used as a reducing agent, in particular it can be used as a reducing agent in a process for converting metal oxides to metals through a smelting process to recover the contained metals. The RACS product disclosed herein may be at least 50% as effective as coke and in some cases even more effective than coke. Relative effectiveness compared to coke may be at least 50%, at least 75%, at least 90%, at least 100%, at least 110%, at least 125% or even more. The following non-limiting examples illustrate specific aspects of the present invention.

Approximately 100 lbs of waste material comprised of paper, plastic, rubber and other debris was dried and then shredded by a granulator through a ½ inch screen. The amount of moisture left in the material after air drying was measured to be 1.7-2.0% and the bulk density was determined to be 4 lbs/cu. ft. The material was passed through a metal detector and screened with a magnet to ensure that it was free of any large pieces of metal. The shredded waste material was metered via a volumetric single screw feeder with a special agitator to the main feed port on the mixer. The mixer used was a BP-50 (50 mm) twin screw mixer set up with a 25:1 L/D barrel length. The mixer included a multi stage agitator arrangement for processing the waste material. One (1) atmospheric vent stack was utilized downstream on the mixer after the main feed port to allow any off gases from the material to vent out of the mixer. The mixer was heated at 450 to 480° F. to process the material. A second twin screw volumetric feeder metered the fume (lead/tin) with the plastic/paper into the main feed port. These feeders were pre calibrated for metering the materials. The fume material was composed of mostly lead and tin oxides.

Processing parameters (speed, throughput and temperature) were varied during various runs. The amount of fume was varied from about 18 to 30% by weight. Adding the fume with the waste material in the main feed port resulted in a significant increase in throughput (increasing from about 55 to 65 lbs/hr to over 80 lb/hr). The extrudate was discharged out the open end of the mixer. The extrudate was well mixed. In accordance with some aspects, the extrudate may be cooled to facilitate formation of pellets of suitable size and composition.

Table 4 illustrates the relative reducing power of RACS, prepared in accordance with one aspect of the present invention, compared to purchased coke.

TABLE 4

Comparison of Reducing Power of RACS Compared to Purchased Coke

| | Weight (grams) | | |
|---|---|---|---|
| | Test 1 | Test 2 | Test 3 |
| Oxides | 300.0 | 300.0 | 300.0 |
| Coke | — | — | 40.0 |
| RACS | — | 40.0 | — |
| Fume blended with, and contained in RACS (30% of RACS total wt) | — | 12.0 | — |
| Net reducing agent (partially coked organic material) | | 28.0 | |
| Soda Ash | 54.0 | 54.0 | 54.0 |
| Crucible tare | 459.2 | 459.5 | 459.0 |
| Gross weight Crucible + Contents | 813.2 | 893.5 | 853.0 |
| Gross Crucible Weight after heating | 756.0 | 760.7 | 754.7 |
| Total metal recovered | 127.3 | 240.5 | 273.9 |
| Metal from reduction (Total metal recovered − metal recovered from Test 1) | — | 113.2 | 146.6 |
| Ratio of metal reduced to reductant used (Test 2 excludes fume weight) | — | 4.04 | 3.67 |
| Effectiveness of reduction relative to purchased coke | — | 110.3% | 100.0% |

In another test, samples were evaluated for reducing power comparing paste and wipes to coke. Samples were prepared by combining de-tinning dross from a secondary battery smelter (typical composition set forth in Table 5) with soda ash and the reducing agent. Paste and wipes were chopped into small pieces (about ¼ inch) before combining with the other components. The compositions were compressed into non-friable pellets using a Spectropress 12 ton press to produce 40 mm pucks. Each of the pellets was placed in a crucible and placed in a furnace at 1800° F. to smelt the metals. The amount of metal recovered was measured and compared after accounting for the amount of metal present in the baseline composition (tin-lead oxides without the reducing agent). The results are presented in Table 6.

TABLE 5

De-tinning Dross

| Element | Assay % |
|---|---|
| Sn | 2.31 |
| Pb | 67.3803 |
| Sb | 3.2580 |
| Cu | 1.8187 |
| Ni | 0.0000 |
| Zn | 0.0000 |
| Cd | 0.0000 |
| Bi | 0.0000 |
| As | 0.3820 |
| Al | 0.0000 |
| Fe | 0.3513 |
| Ag | 0.0000 |
| Au | 0.0000 |
| Pd | 0.0000 |
| In | 0.0000 |
| B | 0.0000 |
| S | 1.7798 |
| Si | 0.0000 |
| Ca | 0.1901 |
| Mg | 0.0000 |
| Se | 0.0461 |
| Cr | 0.0000 |
| Pt | 0.0000 |
| Be | 0.0000 |
| Co | 0.0000 |
| P | 0.0000 |
| | % |
| sum | 77.5 |

TABLE 6

Reduction with Coke vs. Wipes

| Description | Baseline wt. (g) | Coke wt. (g) | Wipes (#1) wt. (g) | Wipes (#2) wt. (g) |
|---|---|---|---|---|
| de-tinning dross | 200 | 200 | 200 | 200 |
| soda ash | 48 | 48 | 48 | 48 |
| coke | | 24 | | |
| wipes | | | 24 | 34 |
| metal recovered | 71.3 | 168.2 | 148.1 | 151.7 |
| metal recovered (%) | 35.65% | 84.10% | 74.05% | 75.85% |
| existing metal | | 71.3 | 71.3 | 71.3 |
| net metal recovered | | 96.9 | 76.8 | 80.4 |
| net metal recovered (%) | | 48.45% | 38.40% | 40.20% |
| % of coke result | | 100.0% | 79.3% | 83.0% |
| slag recovered | 146.4 | 47.2 | 71.2 | 64.11 |

Although certain embodiments of the present application have been described in detail with respect to processing a blend of mixed waste material and smelter byproducts through a heated twin screw mixer, other mixing devices may be utilized to produce an acceptable RACS product. For example, other mixing devices capable of producing intensive mixing may be used such as pin mixers, ribbon mixers, pug mills, extruders, etc. Moreover, in accordance with certain aspects, the composition used to form the RACS may be densified into pellets, pucks, briquettes, etc. using a suitable device capable of densifying the composition even in the absence of heating. Accordingly, the RACS product may contain waste material that has been pyrolyzed, partially pyrolyzed or not pyrolyzed. Furthermore, RACS may be produced from mixed waste even in the absence of using smelter byproducts.

While this invention has been described in detail with reference to certain embodiments, it should be appreciated that the present invention is not limited to those precise embodiments. Rather, in view of the present disclosure, many modifications and variations would present themselves to those skilled in the art without departing from the scope and spirit of this invention.

What is claimed is:

1. A process for converting organic wastes into a reducing agent-coke substitute comprising:
   blending mixed waste material comprising a metal oxide with a metal-containing smelter byproduct, and processing the blend of mixed waste material and smelter byproduct through a heated mixing device at a temperature between about 200° F. and about 750° F. to convert the blend into a reducing agent-coke substitute;
   providing the reducing agent-coke substitute as a reducing agent in a smelting process, wherein the reducing agent-coke substitute converts the metal oxide of the mixed waste material into metal;
   performing the smelting process; and
   recovering the metal from the smelting process.

2. The process of claim 1 wherein said heated mixing device comprises a twin screw mixer.

3. The process of claim 1 wherein said heated mixing device comprises a main feed port and the mixed waste material and the smelter byproduct are both introduced to the mixer through the main feed port.

4. The process of claim 1 wherein said mixed waste material and the smelter byproduct are each introduced to the mixer at different locations on the mixer.

5. The process of claim 1 wherein said temperature is between about 400° F. and 585° F.

6. The process of claim 1 wherein said reducing agent-coke substitute comprises from about 5% to about 60% by weight of the smelter byproduct.

7. The process of claim 6 wherein said reducing agent-coke substitute comprises from about 20% to about 40% by weight of the smelter byproduct.

8. The process of claim 1 wherein said smelter byproduct is selected from the group consisting of fume, dross, oxides, filter cakes and mixtures thereof.

9. The process of claim 1 wherein said mixed waste material comprises at least one of solder paste tubes, solder paste jars, wipes, latex gloves, wooden or paper cotton swabs, cardboard, and vinyl scrap from x-ray shielding products.

10. The process of claim 1 wherein the reducing agent-coke substitute is at least 50% as effective as coke with respect to the recovery of metal from the metal oxide of the mixed waste materials.

11. The process of claim 1 further comprising shredding the mixed waste material before blending with the smelter byproduct.

12. The process of claim 11 wherein said waste material is shredded to an average particle size of less than ½ inch in diameter.

13. The process of claim 1 wherein said reducing agent-coke substitute is non-friable.

14. The process of claim 1, further comprising sorting the mixed waste material before the blending step.

15. The process of claim 14, further comprising removing iron, steel, and other magnetic components of the mixed waste material with a magnet during the sorting step.

16. The process of claim 1, wherein the smelting process takes place in a smelting furnace with a temperature of about 1500° F. to about 2500° F.

17. A process for converting organic wastes into a reducing agent-coke substitute comprising:
   providing a mixed waste material, the mixed waste material comprising a metal oxide of at least one economically recoverable metal and at least one organic material;
   providing a metal-containing smelter byproduct;
   blending the mixed waste material and the smelter byproduct;
   processing the blend of mixed waste material and smelter byproduct through a heated mixing device at a temperature between about 200° F. and about 750° F. to convert the blend into a reducing agent-coke substitute; and
   performing a smelting process comprising a smelting furnace operating at a temperature of about 1500° F. to about 2500° F., wherein the reducing agent-coke substitute is present in the smelting process as a reducing agent and converts the metal oxide of the mixed waste material into metal.

18. The process of claim 17 wherein the economically recoverable metal is tin, lead, antimony, silver, or gold.

19. The process of claim 18 wherein the economically recoverable metal is tin.

20. The process of claim 18 where the economically recoverable metal is lead.

21. The process of claim 17, wherein the mixed waste material comprises waste materials generated in an electronics manufacturing process.

22. The process of claim 17, wherein the mixed waste material comprises at least one of solder paste tubes, solder paste jars, wipes, latex gloves, wooden or paper cotton swabs, cardboard, and vinyl scrap from x-ray shielding products.

23. The process of claim 17, further comprising recovering the economically recoverable metal from the smelting process.

24. The process of claim 17, wherein the mixed waste material comprises x-ray aprons.

* * * * *